(12) United States Patent  
Farahati et al.

(10) Patent No.: US 9,915,331 B2
(45) Date of Patent: Mar. 13, 2018

(54) WET FRICTION MATERIALS INCLUDING CALCIUM SILICATE

(71) Applicant: Schaeffler Technologies AG & Co. KG, Herzogenaurach (DE)

(72) Inventors: Rashid Farahati, Copley, OH (US); Murat Bakan, Puebla (MX); Babak LotfizadehDehkordi, Copley, OH (US)

(73) Assignee: Schaeffler Technologies AG & Co. KG, Herzognaurach (DE)

( * ) Notice: Subject to any disclaimer, the term of this patent is extended or adjusted under 35 U.S.C. 154(b) by 64 days.

(21) Appl. No.: 14/996,269

(22) Filed: Jan. 15, 2016

(65) Prior Publication Data

US 2017/0204953 A1 Jul. 20, 2017

(51) Int. Cl.
*F16H 45/02* (2006.01)
*F16D 69/02* (2006.01)
(Continued)

(52) U.S. Cl.
CPC ................ *F16H 45/02* (2013.01); *C08L 1/02* (2013.01); *F16D 69/02* (2013.01);
(Continued)

(58) Field of Classification Search
CPC ............. F16D 69/02; F16D 2200/0065; F16D 2200/0069; C08L 1/02; C08L 2205/16
See application file for complete search history.

(56) References Cited

U.S. PATENT DOCUMENTS 4,348,490 A * 9/1982 Ogiwara ............... F16D 69/026
523/156
4,994,506 A * 2/1991 Anton ...................... C08K 7/26
523/155
(Continued)

FOREIGN PATENT DOCUMENTS

CN 201010185988 11/2011
CN 102796270 A 11/2012
WO 2014203142 A1 12/2014

OTHER PUBLICATIONS

Celite Technical Data DiaFil 230; dated Dec. 11, 2002; Celite Corporation, Fernley, Nevada; 1 page.
(Continued)

*Primary Examiner* — Ramya P Burgess
*Assistant Examiner* — David R Morris
(74) *Attorney, Agent, or Firm* — Kevin L. Parks

(57) ABSTRACT

A friction material for a clutch pad comprising: a plurality of fibers; and, a filler material including at least 0.1% and at most 100% calcium silicate particles by weight based on total weight of the filler. A friction material for a clutch comprising: a plurality of fibers; a filler material including at least 0.1% and at most 40% calcium silicate particles by weight based on total weight of the friction material; the calcium silicate particles characterized by a specific surface area of at least 40 m²/g and an average particle size of at most 60 μm; and, a binder. In an example aspect, the calcium silicate particles are characterized by a spherical morphology. In another example aspect, the calcium silicate particles
(Continued)

are characterized by a specific surface area of about 105 m²/g and an average particles size of about 10 µm.

18 Claims, 4 Drawing Sheets

(51) Int. Cl.
*C08L 1/02* (2006.01)
*F16D 13/60* (2006.01)

(52) U.S. Cl.
CPC .......... *C08L 2205/16* (2013.01); *F16D 13/60* (2013.01); *F16D 2200/0065* (2013.01); *F16D 2200/0069* (2013.01); *F16H 2045/0289* (2013.01)

(56) References Cited

U.S. PATENT DOCUMENTS

| | | | | |
|---|---|---|---|---|
| 5,087,642 | A | 2/1992 | Seki et al. | |
| 5,104,972 | A * | 4/1992 | Madgavkar | B01J 31/0212 523/310 |
| 5,383,963 | A * | 1/1995 | Kobayashi | C01G 23/005 106/36 |
| 5,384,344 | A | 1/1995 | Kamioka et al. | |
| 5,709,827 | A * | 1/1998 | Andersen | B01F 3/1214 264/102 |
| 6,121,168 | A | 9/2000 | Irifune et al. | |
| 6,316,086 | B1 * | 11/2001 | Beier | F16D 69/028 428/113 |
| 6,379,446 | B1 * | 4/2002 | Andersen | C08L 1/02 106/137.1 |
| 6,524,681 | B1 * | 2/2003 | Seitz | D06N 7/00 104/18 |
| 6,586,373 | B2 | 7/2003 | Suzuki et al. | |
| 7,326,742 | B2 | 2/2008 | Kawabata et al. | |
| 8,863,917 | B2 | 10/2014 | Subramanian | |
| 9,624,983 | B2 * | 4/2017 | Nickel | F16D 13/52 |
| 9,771,994 | B2 * | 9/2017 | Bakan | F16D 69/028 |
| 2004/0044107 | A1 * | 3/2004 | Kikuchi | C08L 23/10 524/186 |
| 2010/0084233 | A1 | 4/2010 | Subramanian | |
| 2012/0108698 | A1 | 5/2012 | Lam et al. | |
| 2013/0037360 | A1 | 2/2013 | Chen et al. | |
| 2014/0087982 | A1 | 3/2014 | Calcavecchio et al. | |
| 2016/0053823 | A1 * | 2/2016 | Nickel | F16D 55/36 192/107 M |
| 2016/0053824 | A1 * | 2/2016 | Nickel | F16D 13/648 192/107 M |
| 2017/0022355 | A1 * | 1/2017 | Becquet | F16D 69/026 |
| 2017/0159738 | A1 * | 6/2017 | Farahati | F16D 69/026 |

OTHER PUBLICATIONS

Promaxon D: Improving performance and cost of disc brake pads; dated Jul. 2011; Lapinus Intelligent fibres, Roermond, The Netherlands; 1 page.
Promat Promaxon-D Technical Data Sheet; dated Sep. 16, 2014; Promat; 2 pages.
Celite Micro-Cel C, T-38, CALFLO C Safety Date Sheet #2600; Rev. 13; dated May 5, 2015; Imerys, San Jose, CA; 2 pages.
Celite Micro-Cel T-49 Technical Data; undated; Celite Corporation, Lompoc, California; 1 page.
Promaxon D in friction material applications; undated; Lapinus Intelligent fibres; 6 pages.
International Search Report and Opinion for PCT/US2017/013160; 10 pgs; dated Apr. 28, 2017 by Korean Intellectual Property Office.

* cited by examiner

WET FRICTION MATERIALS INCLUDING CALCIUM SILICATE

FIELD

The present disclosure relates generally to a wet friction material for clutch pads, in particular, a wet friction material with a higher friction coefficient.

BACKGROUND

U.S. Pat. No. 6,121,168, hereby incorporated by reference herein, describes a diatomaceous earth in the form of porous, cylindrical particles as friction modifier in wet paper friction material. U.S. Pat. No. 6,586,373 discloses a wet friction material including filler including disc-shaped diatomaceous earth and another filler material having a high Mohs hardness, from 8 to 9.5, such as silicon nitride, alumina, aluminum silicate and others. U.S. Patent Publication No. 2014/0087982 discloses microcapsules of lubricant additives in an oil.

BRIEF SUMMARY

Example aspects broadly comprise a friction material for a clutch pad comprising: a plurality of fibers; and, a filler material including at least 0.1% and at most 100% calcium silicate particles by weight based on total weight of the filler. In an example aspect, the filler material includes at least 5% and at most 60% calcium silicate particles by weight based on total weight of the filler. In an example aspect, the filler material includes at least 5% and at most 30% calcium silicate particles by weight based on total weight of the filler. In an example aspect, the filler material includes at least 5% and at most 10% calcium silicate particles by weight based on total weight of the filler. In an example aspect, at least a majority of the calcium silicate particles are characterized by a spherical morphology. In an example aspect, the calcium silicate particles further comprise a core. In an example aspect, the core includes macro-pores. In an example aspect, the core includes a friction modifier. In an example aspect, the friction modifier is compatible with automatic transmission fluid. In an example aspect, the calcium silicate particles are characterized by a porosity of about 95% and an average particle size of at least 35 μm and at most 85 μm. In an example aspect, the calcium silicate particles are PROMAXON®D. In an example aspect, the calcium silicate particles have a specific surface area as measured by BET method of at least 40 $m^2/g$. In another example aspect, the calcium silicate particles have a specific surface area as measured by BET method of at least 100 $m^2/g$. In an example aspect, the calcium silicate particles have a specific surface area as measured by BET method about 105 $m^2/g$ and an average particle size of about 10 μm. In an example aspect, the calcium silicate particles have an oil absorption of at most 190 percent by weight. In an example aspect, the calcium silicate particles are MICRO-CEL®T-49.

Other example aspects broadly comprise a friction material for a clutch comprising: a plurality of fibers; a filler material including at least 0.1% and at most 40% calcium silicate particles by weight based on total weight of the friction material; the calcium silicate particles characterized by a specific surface area of at least 40 $m^2/g$ and an average particle size of at most 60 μm; and, a binder. In an example aspect, the calcium silicate particles are further characterized by a spherical morphology and the oil absorption is at most 300 percent by weight. In an example aspect, the calcium silicate particles are further characterized by a specific surface area of about 105 $m^2/g$, an average particles size of about 10 μm, and an oil absorption of at most 190 percent by weight.

Other example aspects broadly comprise a torque converter comprising: a clutch; a plate; the friction material as described above and disposed between the clutch and the plate.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

The following description is made with reference to FIGS. 1-4.

Figure 1:
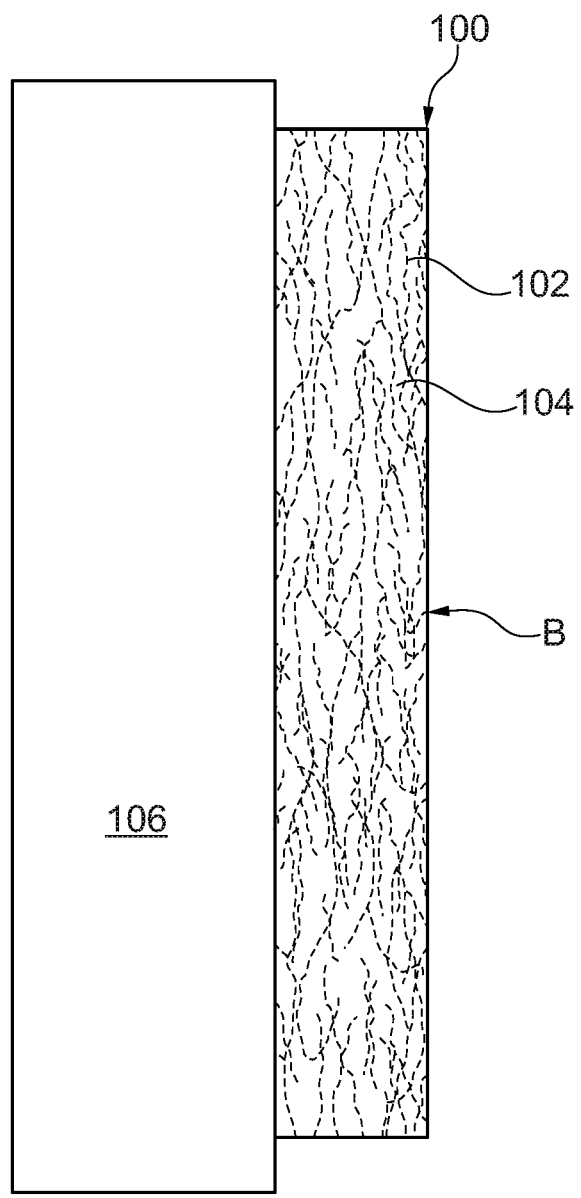
FIG. 1 illustrates a schematic cross-sectional view of a friction material including calcium silicate according to an example aspect.
Figure 2:
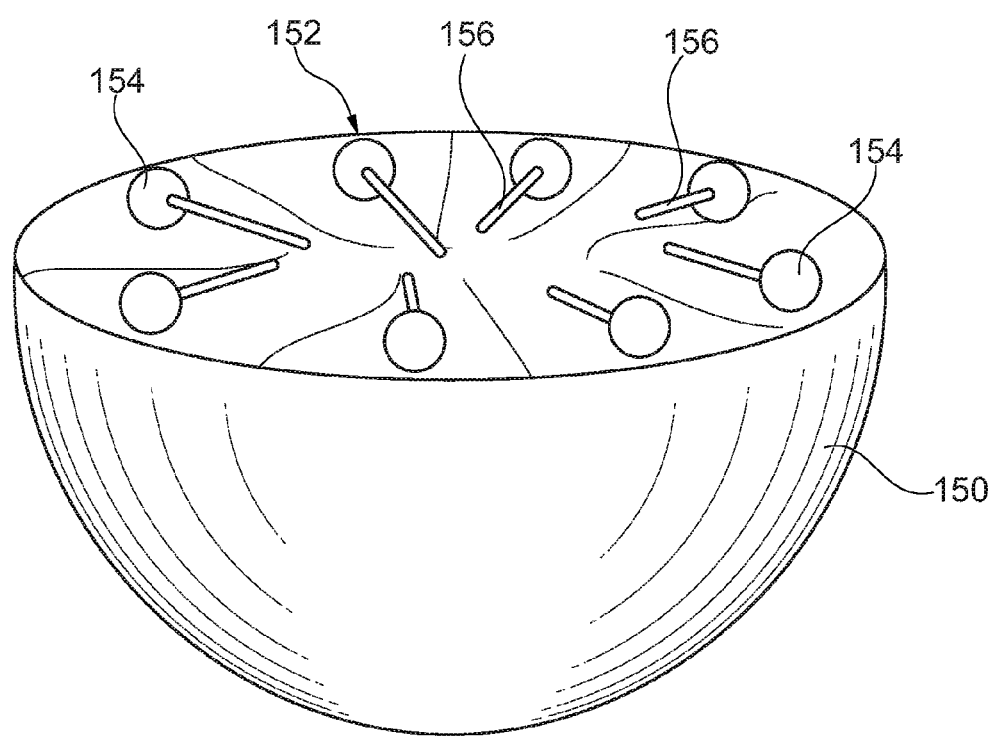
FIG. 2 illustrates a schematic cut-away representation of half of a spherical, porous particle according to an example aspect.

Wet friction materials as known in the art are useful for example for clutches. In an example aspect, a friction material for a clutch comprises a plurality of fibers and a filler material including calcium silicate. FIG. 1 is a schematic cross-sectional view of friction material 100 including calcium silicate. In an example aspect, the calcium silicate is comprised of spherical and/or synthetic particles. In an example aspect, the calcium silicate is characterized by at least one of the following properties: a high specific surface area, a high porosity, a small average particle size, hollowness (or containing a core), a low oil absorption, or any combination thereof. In an example aspect, the calcium silicate particles are useful to carry, to be available to, to attract, or to encapsulate a friction modifier. Friction modifier is an additive, for example, in automatic transmission fluid (ATF). Many friction modifiers as are known in the art for lubrication are suitable, in an example aspect, provided compatibility with the metal clutch, i.e. steel plates, and with the ATF for a clutch or torque converter is maintained. Friction modifiers interact with metal surfaces with polar heads of the friction modifier bonding to the clutch metal surface and repulsive forces from the molecules' tails, for example, aiding in separation of the metal surfaces.

Friction material 100 can be used on any clutch plate 106 known in the art. In an example embodiment, friction material is fixedly secured to plate 106. Friction material 100 includes fiber material 102 and filler material 104 including calcium silicate. Friction material 100 further includes binder B, such as a phenolic resin, a latex, a silane, or a mixture thereof. Fiber material 102 can be any organic or inorganic fiber known in the art, for example including but not limited to cellulose fibers, cotton fibers, aramid fibers, carbon fibers, or any combination thereof.

In an example aspect, filler material 104 includes at least a plurality of calcium silicate particles. In another example aspect, filler material 104 further includes at least one silica-containing material other than calcium silicate. Any silica-containing material known in the art can be used. In an example embodiment, the silica-containing material includes, but is not limited to: Celite®, Celatom®, diatomaceous earth, or silicon dioxide. Silicon dioxide is also referred to as silica or $SiO_2$. Typically diatomaceous earth is amorphous.

Calcium silicate is known generally as one of a group of compounds obtained by reacting calcium oxide and silica in various ratios e.g. $3CaO.SiO_2$, $Ca_3SiO_5$; $2CaO.SiO_2$, $Ca2SiO_4$; $3CaO.2SiO_2$, $Ca3Si_2O_7$ and $CaO.SiO_2$, $CaSiO_3$. Calcium silicate is a white free-flowing powder derived from limestone and diatomaceous earth and is also known as calcium orthosilicate. Calcium silicate can be derived naturally or can be synthetically made with specific characteristics and properties.

Calcium silicate is desirable for its properties such as high surface area, high porosity, small particle size, hollowness, or a combination thereof. Without being bound by theory, it is believed that the calcium silicate provides for improved and increased interaction with friction modifiers compatible with ATF, while also providing for better performance, i.e. providing a positive slope for friction coefficient at high speeds and in a wide range of pressure and temperature levels. Furthermore, the low absorption properties of some calcium silicate particles may increase durability and performance of the wet friction paper. Without being bound by theory, it is believed that the high surface area particles having low absorption properties allow ATF to flow easily through the filler, thus distributing the lubricant evenly for improved performance.

Calcium silicate particles useful in the present invention include, for example, fillers Filler A and Filler B, the properties for which are shown below in Table 1. Comparative example Filler C is diatomaceous earth.

TABLE 1

| Property | Unit | Filler A | Filler B | Filler C |
| --- | --- | --- | --- | --- |
| Chemical formula | | $Ca_6Si_6O_{17}(OH)_2$ | $CaSiO_3$ | $SiO_2$ |
| Melting point | ° C. | >1500 | — | — |
| Average particle size | μm | 35-85 | 10 | 11 |
| Morphology | | spherical | irregular | amorphous |
| Moisture content | wt % | <3 | 8 | 3 |
| Oil absorption | wt % | 300 | 190 | 120 |

TABLE 1-continued

| Property | Unit | Filler A | Filler B | Filler C |
| --- | --- | --- | --- | --- |
| Specific surface area | $m^2/g$ | >40 | 105 | 30.1 |
| pH | | 9-10 | 7.5-11 | 8 |
| Hardness | Moh | | 6.5 | — |

Calcium silicates are available from various sources and suppliers. Filler A includes non-limiting example PROMAXON®D available from Lapinus® Intelligent Fibres, Roermond, The Netherlands. Filler B includes non-limiting example MICRO-CELT-49 available from Celite Corporation, Lompoc, Calif., which according to product literature may contain up to 6% crystalline silica consisting of less than 2% quartz and/or less than 4% cristobalite.

Filler A is generally characterized as a spherical calcium silicate, which is a synthetic hydrated calcium silicate synthesized hydrothermally under autogeneous pressure. This material exhibits some basicity due to the presence of calcium, and in a 4% by weight dispersion in water, the pH reaches a value of around 10. Filler A is also sometimes referred to as xonotlite, calcined in ambient air at a relative humidity of about 50% at two different temperatures, namely 650° C. and 750° C., each for a period of 24 hours. The initial xonotlite, with a BET surface area of 51 $m^2/g$ and a pore volume (of less than 100 nanometers) of 0.35 ml/g transformed crystalline phases upon calcination. After calcination at 650° C., the calcium silicate retained its crystallinity which corresponds to that of xonotlite, with a BET surface area of 47.4 m2/gram and a pore volume (less than 100 nanometers) of 0.30 ml/gram. After the calcination at 750° C., the xonotlite was transformed into wollastonite (having the crystalline phase $CaSiO_3$) by losing one water molecule thus making the carrier less basic. Furthermore, as a result of calcination at 750° C. the carrier's pore volume is reduced to about 0.09 ml/gram (for pore sizes of less than 100 nanometers) and the BET surface area was correspondingly reduced to 38 m2/gram. Brunauer, Emmett and Teller (BET) Theory refers to multi layer adsorption, and usually adopts non-corrosive gases (like nitrogen, argon, carbon dioxide, etc.) as adsorbates to determine the surface area data. The specific surface area of a powder is determined by physical adsorption of a gas on the surface of the solid and by calculating the amount of adsorbate gas corresponding to a monomolecular layer on the surface. Physical adsorption results from relatively weak forces (van der Waals forces) between the adsorbate gas molecules and the adsorbent surface area of the test powder. The determination is usually carried out at the temperature of liquid nitrogen. The amount of gas adsorbed can be measured by a volumetric or continuous flow procedure. Filler A has a BET specific surface area of greater than 40 $m^2/g$.

PROMAXON®D is synthesized via a crystallization and controlled crystal growth process wherein particles are formed with a spherical, porous morphology. The porosity of these particles is very high at about 95%. The average particle size of these spherical, porous particles is at least 35 μm to at most 85 μm; in an example aspect, the average particle size is about 60 μm. In an example aspect, the special spherical, porous morphology is useful, wherein PROMAXON®D includes micro-pores at the outside or particle shell and macro-pores at the inside. In other words, the particles include internal macro-pores so that the particles behave as hollow, spherical particles. In an example aspect, the hollow, spherical particles are useful as a carrier for at least one friction modifier, wherein the particles are loadable with a liquid and/or solid friction modifier compatible with ATF and the friction modifier is encapsulated in the macro-pores. The spherical, hollow calcium silicate particles are useful as a friction modifier carrier in an example aspect.

Filler B is generally characterized as a synthetic hydrated calcium silicate known previously as an adsorbent filter aid that has the ability to remove various organic and inorganic acids from a variety of liquid systems including animal and vegetable oils, solvents, organic chemicals and plasticizers. Filler B has a BET specific surface area of about 105 $m^2/g$. Without being bound by theory, it is believed that the high specific surface area and fine particle size allows for more surface interactions with the friction modifier, which is present in the ATF for example. The average particle size of Filler B is about 10 μm. Less than 10% by weight of the Filler B particles are retained by 325 sieve. In other words, at least 90% by weight of the Filler B particles are less than equivalent spherical diameter of 44 μm.

Comparative example Filler C is a diatomaceous earth, for example DiaFil® 230, having a median particle size of 11 μm, an oil absorption of 120, and a specific surface area of 30 $m^2/g$. The crystalline silica content of DiaFil® 230 is less than 0.1% by weight.

Without being bound by theory, it is believed that calcium silicate having high specific surface area, small average particle size, and/or high pore volume contributes to increased interactions with the surface active friction modifier component of the ATF. Alternatively or in addition to, it is believed that hollow and/or spherical calcium silicate particles provide a vehicle, if desired, for interacting with, carrying, and/or encapsulating friction modifier compatible with ATF. For wet friction material for clutch applications, any friction modifier as known in the art may be used. Friction modifier(s) typically are included as part of an additive package in an ATF formulation. In an example aspect, friction modifier(s) are present in an amount less than the total amount of the additive package, i.e. about 3 to 20% by volume, for the ATF. In another example aspect, friction modifier(s) are present in an amount less than the total amount of the additive package, i.e. about 6 to 12% by volume, for the ATF.

Typical friction modifiers include fatty amines, fatty acids, fatty amides, fatty esters, paraffin waxes, oxidized waxes, fatty phosphates, sulfurized fats, long chain alkylamines, long chain alkylphosphites, long chain alkylphosphates, borated long chain polars, or others as known in the art. In an example aspect, the friction modifier comprises a generally straight oleophilic tail portion including ten to 24 carbons (10-24 C) as well as an active polar head group portion. In another example aspect, the tail portion includes 18 to 24 carbons (18-24 C). The head portions form layers on the friction surfaces by surface absorption. Friction modifiers must be compatible, meaning do not corrode or cause degradation, with not only the friction material but also the clutch plate, typically made of steel. A non-limiting example of a friction modifier useful in an example aspect is stearic acid. Preferably, at least one friction modifier compatible with ATF is useful in an example aspect.

In an example aspect, calcium silicate is a component in friction material. In an example aspect, calcium silicate comprises 0.1 to 100% of the filler in a friction material. In an example aspect, calcium silicate is included as at least one component as filler in a friction material in order to improve interactions with friction modifier in ATF.

Calcium silicate is a component in friction material according to the following amounts. In an example aspect, filler 104 includes at most 100% by weight calcium silicate based on total weight of the filler. In an example aspect, filler material 104 is between 0.1 and 100 percent by weight calcium silicate based upon the total weight of filler material 104. In another example aspect, friction material 100 is between 0.1 and 40 percent by weight calcium silicate based upon the total weight of friction material 100. In an example aspect, filler material comprising a silica-rich material such as diatomaceous earth filler is at least partially substituted with calcium silicate as filler material for friction material in a range from about 0.1 to about 100% by weight based upon the total weight of the filler material.

A suitable amount of calcium silicate is at least 0.1 to at most 100% by weight based on the total weight of the filler material in an example aspect, at least 1 to at most 80% in an example aspect, at least 5 to at most 60% in another example aspect, at least 5 to at most 45% in another example aspect, and at least 5 to at most 30% in another example aspect, and at least 5 to at most 15% in another example aspect, and at least 5 to at most 10% in yet another example aspect.

In an example aspect, friction material 100 includes at most 40% by weight calcium silicate based on total weight of friction material. Wherein an example formulation for friction material includes approximately, or within plus or minus 5% by weight, equal amounts by weight of fiber, filler, and resin components, the calcium silicate content in friction material is in a range from about 0.1 to about 40% by weight based on the total weight of the friction material. A suitable amount of calcium silicate is at least 0.1 to at most 40% by weight based on the total weight of the friction material in an example aspect; at least 1 to at most 30% in an example aspect, at least 2 to at most 20% in another example aspect, at least 2 to at most 17% in another example aspect, at least 2 to at most 15% in another example aspect, and at least 2 to at most 10% in yet another example aspect.

Example formulations, wherein at least a portion of the diatomaceous earth filler conventionally used as filler is replaced by calcium silicate additions, are detailed below. In an example aspect herein, the non-limiting calcium silicate example as in Filler A of Table 1 is used as a component material in a filler for friction material in Example 1. In an example aspect herein, the non-limiting calcium silicate example as in Filler B of Table 1 is used as a component material in a filler for friction material in Example 2. Comparative Example 3 includes diatomaceous earth as in Filler C of Table 1.

Example 1: Friction material includes 10 percent Filler A PROMAXON®D calcium silicate, 35 percent diatomaceous earth, 55 percent fibers (40% cellulose fibers, 10% aramid fibers, 5% carbon fibers), and a latex binder. Percentages are by weight. In other words, the filler material of Example 2 includes about 22% by weight calcium silicate based on total weight of the filler; or about 7% by weight calcium silicate based on total weight of the friction material including binder.

Example 2: Friction material includes 10 percent Filler B MICRO-CEL®T-49 calcium silicate, 35 percent diatomaceous earth, 55 percent fibers (40% cellulose fibers, 10% aramid fibers, 5% carbon fibers), and a latex binder. Percentages are by weight. In other words, the filler material of Example 3 includes about 22% by weight calcium silicate based on total weight of the filler; or about 7% by weight calcium silicate based on total weight of the friction material including binder.

Example 3: Friction material includes 45 percent filler, 55 percent fiber, and a latex binder. Percentages are by weight. The filler is 100% diatomaceous earth, or Filler C DiaFil® 230, as is known in the art.

In an example aspect, calcium silicate is preloaded with a friction modifier by methods such as using solvents or fusing. This is particularly useful with calcium silicate particles having a spherical, porous morphology. In an example aspect, the spherical, porous calcium silicate particles are formed with an open inner structure built out of needles surrounded by an outer shell of close knitted crystals. These spherical, porous calcium silicate particles are characterized by micro-pores at the shell outer surface and macro-pores at the inner surface or core. In other words, the calcium silicate particles having a spherical, porous morphology comprise a core including macro-pores, wherein the macro-pores are at least 1 μm to at most 10 μm. In an example aspect, the macro-pores are about 5 μm. Wherein typically ATF is tailored to include an additive package profile to be compatible with regions other than the friction material portions for a clutch or torque converter, for example, alternatively the spherical, porous particles may be preloaded or encapsulated with a friction modifier selected from the group: fatty amines, fatty acids, fatty amides, fatty esters, paraffin waxes, oxidized waxes, fatty phosphates, sulfurized fats, long chain alkylamines, long chain alkylphosphites, long chain alkylphosphates, borated long chain polars, or any combination thereof. In an example aspect, at least one friction modifier compatible with ATF is be preloaded or encapsulated within the core including macro-pores of the spherical, porous calcium silicate particles. In an example aspect, the friction modifiers are encapsulated inside spherical, porous calcium silicate particles. In a first example aspect, a friction modifier compatible with ATF is dissolved in acetone to form a solution. Spherical, porous calcium silicate particles are then stirred in the solution for 24 hours and subsequently the solution is decanted. The encapsulated calcium silicate particles are then used as filler material in the paper making process including the fibers as known in the art. Advantageously, the filler particles having cores filled with friction modifier are distributed randomly in the friction material. As shown schematically in FIG. 2 of a cross-section through spherical, porous particle 150, spherical calcium silicate particles 150 carry friction modifiers 152 having polar heads 154 aligning at the outer diameter of the spherical particles 150 and tails 156. During application or use, as the oil flows through these filler particles, friction modifiers desorb and move to the friction material surface where they provide desired friction characteristics. In a second example aspect, calcium silicate particles are mixed with molten friction modifiers; therefore, eliminating the need for solvent.

Figure 3:
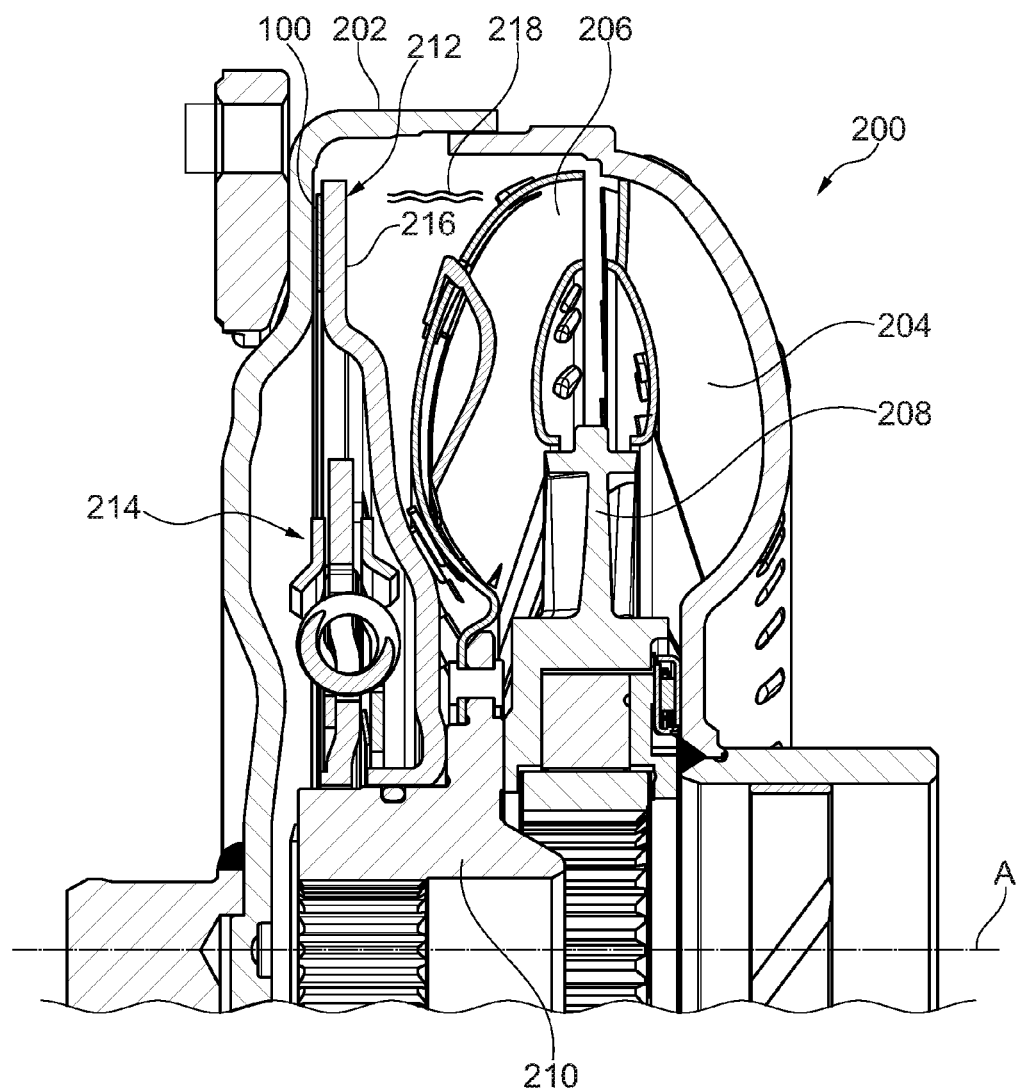
FIG. 3 illustrates a cross-sectional view of a torque converter having friction material according to an example aspect; and, FIG. 4A is a graph plotting friction coefficient versus speed for friction material including calcium silicate according to an example aspect; and, FIG. 4B is a graph plotting friction coefficient versus speed for known friction material.

FIG. 3 is a partial cross-sectional view of example torque converter 200 including friction material 100 shown in FIG. 1. Torque converter 200 includes cover 202, impeller 204 connected to the cover, turbine 206 in fluid communication with the impeller, stator 208, output hub 210 arranged to non-rotatably connect to an input shaft (not shown) for a transmission, torque converter clutch 212, and vibration damper 214. Clutch 212 includes friction material 100 and piston 216. As is known in the art, piston 216 is displaceable to engage friction material 100 with piston 216 and cover 202 to transmit torque from cover 202 to output hub 210 through friction material 100 and piston 216. Fluid 218 is used to operate clutch 212.

Although a particular example configuration of torque converter 200 is shown in FIG. 3, it should be understood that the use of friction material 100 in a torque converter is not limited to a torque converter as configured in FIG. 3. That is, material 100 is usable in any clutch device, using friction material, for any torque converter configuration known in the art.

Figure 4A:
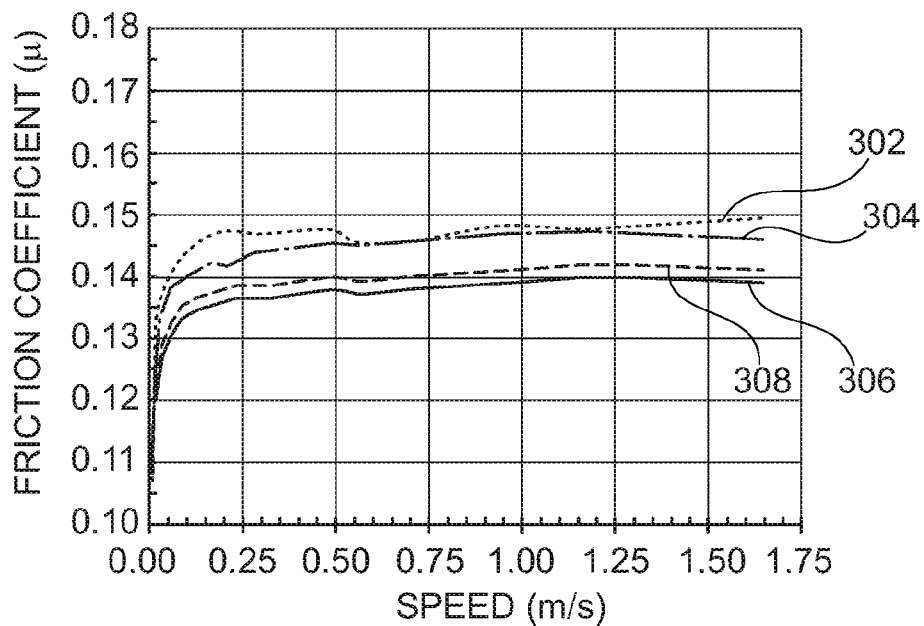
Figure 4B:
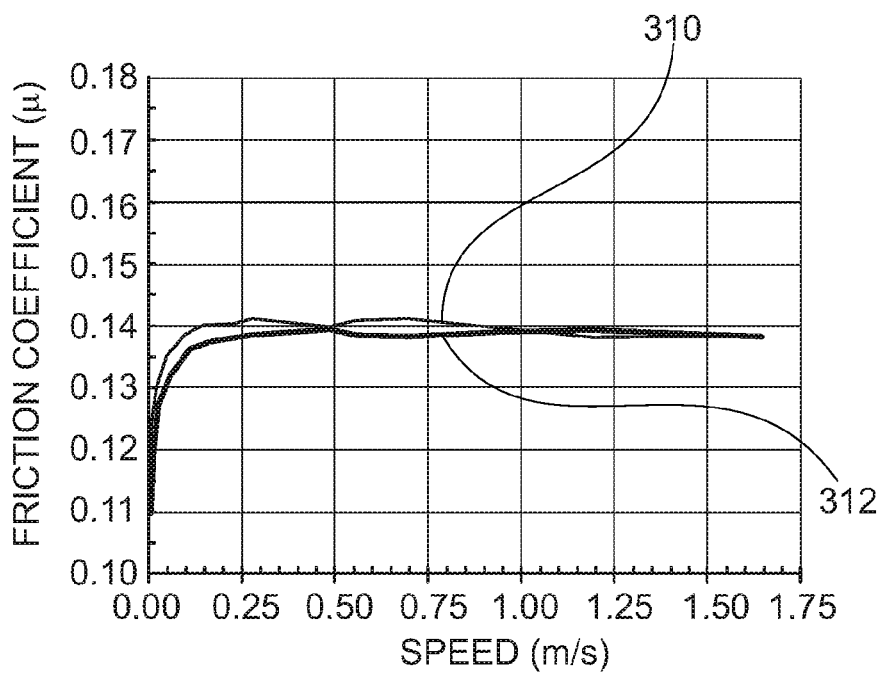

FIG. 4A is a graph plotting respective friction coefficients versus speed for friction material 100 as formulated in Examples 1 and 2 above. FIG. 4B is a graph plotting friction coefficients versus speed for known friction material as in Example 3 without calcium silicate additions. The speed in the x direction of the graph is the speed of the friction material with respect to a plate with which the friction material is in contact with. For example, the speed is the slip speed between the friction material and the plate. Plots 302 and 304 are for material 100 as formulated in Example 1 above wherein the filler material includes 22% calcium silicate Filler A by weight relative to total weight of the filler material at 1940 and 2960 kPa respectively. Plots 306 and 308 are for material 100 as formulated in Example 2 above wherein the filler material includes 22% calcium silicate Filler B by weight relative to total weight of the filler material at 1940 and 2960 kPa respectively. Plots 310 and 312 are for a known friction material including fiber and a diatomaceous earth filler as in Example 3 above at 1940 and 2960 kPa respectively. All plots are for data taken at 90° C. As noted above, it is desirable to have a low static friction coefficient and to maximize the dynamic friction coefficient for friction material for a clutch.

Advantageously, material 100 as in FIG. 4A increases the static friction coefficient in comparison to known friction materials as shown in FIG. 4B for clutches. For example for material 100, at 0.014 m/s as shown in plot 302, has a static coefficient of 0.123 and the static coefficient, also at 0.014 m/s as shown in plot 310 for the known material is less, at approximately 0.120. In an example aspect material 100 has a static coefficient of at least 0.120.

Regarding the dynamic friction coefficient, advantageously, the friction coefficient for plots in FIG. 4A continue to increase from 0.056 to 1.646 m/s. In contrast, the friction coefficient for plots 310 and 312 flatten or decrease between 0.056 to 1.646 m/s. For example, friction coefficients for plots 302, 304, 306, and 308 increase from 0.145 to 0.149, 0.145 to 0.146, 0.140 to 0.142, and 0.137 to 0.139, respectively for friction material 100. Known friction material, without calcium silicate additions, represented by plots 310 and 312 have friction coefficients which flatten or decrease from between 0.056 to 1.646 m/s from 0.140 to 0.138 and from 0.138 to 0.138, respectively.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A friction material for a clutch pad comprising:
   a plurality of fibers; and,
   a filler material including at least 0.1% and at most 100% calcium silicate particles by weight based on total weight of the filler, wherein:
   a plurality of the calcium silicate particles each comprise a core that includes a friction modifier.
2. The friction material of claim 1, wherein the filler material includes at least 5% and at most 60% calcium silicate particles by weight based on total weight of the filler.

3. The friction material of claim 2, wherein the filler material includes at least 5% and at most 30% calcium silicate particles by weight based on total weight of the filler.

4. The friction material of claim 3, wherein the filler material includes at least 5% and at most 10% calcium silicate particles by weight based on total weight of the filler.

5. The friction material of claim 1, wherein at least a majority of the calcium silicate particles are characterized by a spherical morphology.

6. The friction material of claim 1, wherein each core includes macro-pores.

7. The friction material of claim 1, wherein the friction modifier is compatible with automatic transmission fluid.

8. The friction material of claim 1, wherein the calcium silicate particles are characterized by a porosity of about 95% and an average particle size of at least 35 μm and at most 85 μm.

9. The friction material of claim 8, wherein the calcium silicate particles are PROMAXON®D.

10. The friction material of claim 1, wherein the calcium silicate particles have a specific surface area as measured by BET method of at least 40 $m^2/g$.

11. The friction material of claim 10, wherein the calcium silicate particles have a specific surface area as measured by BET method of at least 100 $m^2/g$.

12. The friction material of claim 11, wherein the calcium silicate particles have a specific surface area as measured by BET method about 105 $m^2/g$ and an average particle size of about 10 μm.

13. The friction material of claim 11, where the calcium silicate particles have an oil absorption of at most 190 percent by weight.

14. The friction material of claim 11, wherein the calcium silicate particles are MICRO-CEL®T-49.

15. A friction material for a clutch comprising:
   a plurality of fibers;
   a filler material including at least 1% and at most 40% calcium silicate particles by weight based on total weight of the friction material; the calcium silicate particles characterized by a specific surface area of at least 40 $m^2/g$ and an average particle size of at most 60 μm; and,
   a binder, wherein a plurality of the calcium silicate particles each comprise a core that includes a friction modifier.

16. The friction material of claim 15, wherein the calcium silicate particles are further characterized by a spherical morphology and an oil absorption is at most 300 percent by weight.

17. The friction material of claim 15, wherein the calcium silicate particles are further characterized by a specific surface area of about 105 $m^2/g$, an average particles size of about 10 μm, and an oil absorption is at most 190 percent by weight.

18. A torque converter comprising:
   a clutch;
   a plate;
   the friction material of claim 15 disposed between the clutch and the plate.

* * * * *